(12) United States Patent
Castelli et al.

(10) Patent No.: US 9,413,225 B2
(45) Date of Patent: Aug. 9, 2016

(54) METHOD OF CONTROLLING A POWER FACTOR CORRECTION CONVERTER AND RELATED CLOSED-LOOP CONTROL SYSTEM

(71) Applicant: STMicroelectronics S.r.l., Agrate Brianza (IT)

(72) Inventors: Claudia Castelli, Brugherio (IT); Claudio Adragna, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 14/549,211

(22) Filed: Nov. 20, 2014

(65) Prior Publication Data

US 2015/0155776 A1    Jun. 4, 2015

(30) Foreign Application Priority Data

Nov. 29, 2013 (IT) .............................. MI2013A1998

(51) Int. Cl.
*H02M 1/42* (2007.01)
*H02M 1/00* (2006.01)

(52) U.S. Cl.
CPC .......... *H02M 1/4208* (2013.01); *H02M 1/4225* (2013.01); *H02M 2001/0032* (2013.01); *Y02B 70/126* (2013.01); *Y02B 70/16* (2013.01)

(58) Field of Classification Search
CPC .......................... H02M 1/4208; H02M 1/4225
See application file for complete search history.

(56) References Cited

U.S. PATENT DOCUMENTS

| | | | | |
|---|---|---|---|---|
| 7,295,452 B1* | 11/2007 | Liu | ...................... | H02M 1/4225 363/82 |
| 7,355,354 B2* | 4/2008 | Rust | ................... | H05B 41/2824 315/209 R |
| 2009/0028273 A1* | 1/2009 | Lin | ...................... | H04L 25/4902 375/324 |
| 2011/0267856 A1 | 11/2011 | Pansier | | |
| 2014/0085947 A1* | 3/2014 | Capilla | ............... | H02M 1/4225 363/52 |

OTHER PUBLICATIONS

Jang, Y. et al., "Light-Load Efficiency Optimization Method," IEEE Transactions on Power Electronics 25(1):67-74, Jan. 2010.

* cited by examiner

*Primary Examiner* — Jue Zhang
(74) *Attorney, Agent, or Firm* — Seed IP Law Group PLLC (57) ABSTRACT

A method controls a power factor correction converter that includes a boost inductor and a switch. The method generates a sense signal representing a rectified AC input voltage or an inductor current through the boost inductor, turns on the switch in response to determining, based on the sense signal, a zero current condition through the boost inductor, turns off the switch after an on-time interval, generates a feedback signal based on an output voltage of the converter, and compares the feedback signal with a threshold. If the feedback signal is smaller than the threshold, the method generates a command signal, representing a phase domain including 0 and π, based on the feedback signal and the power threshold, and keeps the switch off when a phase of the input rectified AC voltage or of the inductor current is in the phase domain even if the zero current condition has been determined.

15 Claims, 7 Drawing Sheets

METHOD OF CONTROLLING A POWER FACTOR CORRECTION CONVERTER AND RELATED CLOSED-LOOP CONTROL SYSTEM

BACKGROUND

1. Technical Field

This disclosure relates to electronic control circuits, and more particularly to a method of controlling a power factor correction converter and a related closed-loop control system of a power factor correction converter.

2. Description of the Related Art

Figure 1:
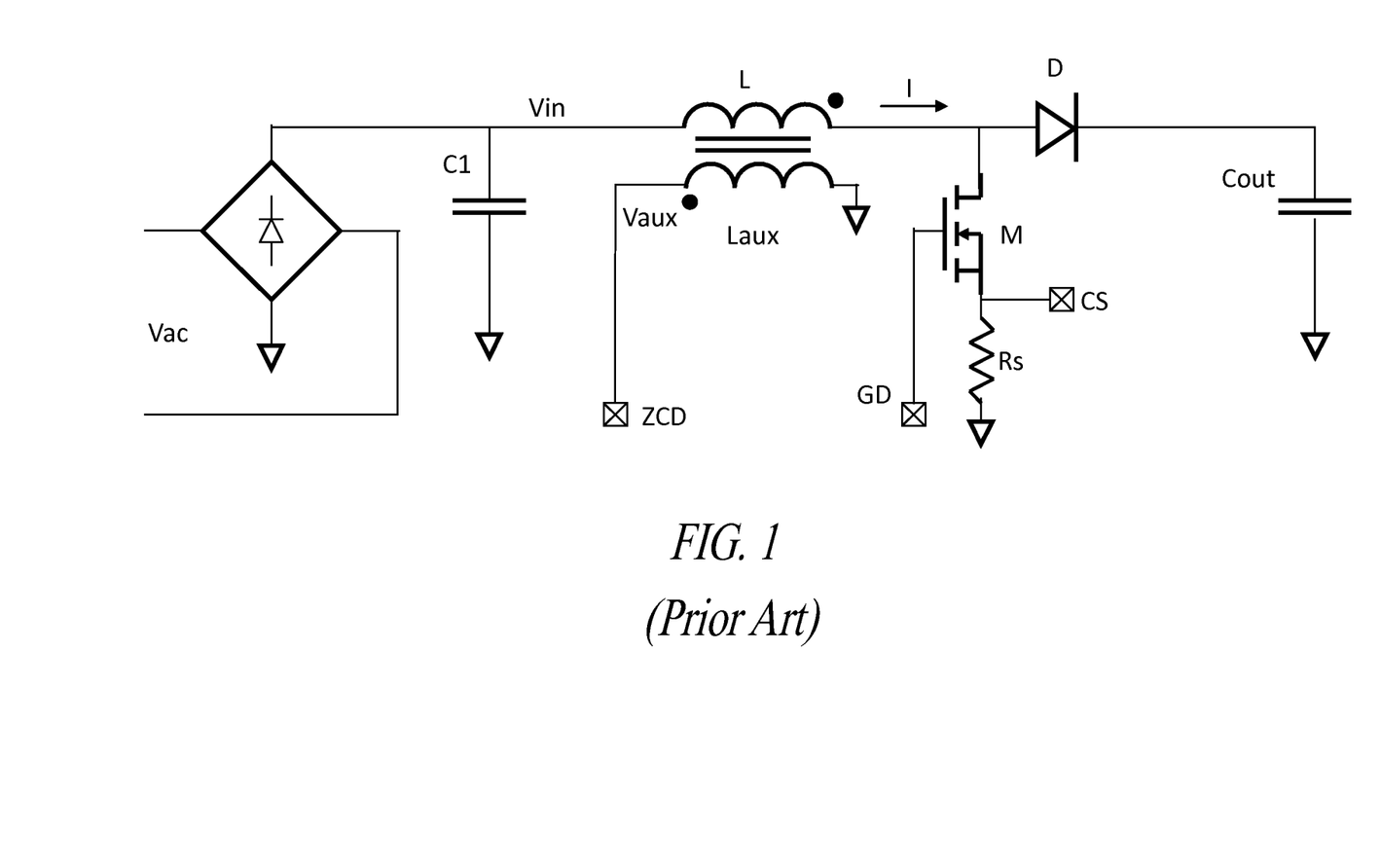
FIG. 1 shows the core circuit (PFC Plant) of a PFC power converter.

Basically, a common example as depicted in FIG. 1, a transition mode (TM) power factor correction converter (PFC) may comprise a boost inductor L, a switch M, a diode D, an output tank capacitor Cout. In the contemplated example, an auxiliary winding Laux is magnetically coupled with the inductor as one exemplary way for sensing a condition of zero current (or zero crossing) in the boost inductor.

However, other ways, equally familiar to the skilled reader, may be chosen, for example a sense resistor in a recirculation current path of the boost inductor through the ground node may be used in lieu of an auxiliary winding.

Control circuit means, commonly based on a microcontroller, may be used for controlling the generation and delivery of a drive signal to the GD node, commonly a square wave, for turning on the switch M when a zero current condition through the inductor is detected (in the considered example by monitoring the voltage on the ZCD sense node), and for turning off the switch after an on-time interval (Ton) set by the controller has elapsed. One may monitor on the sense node CS the current that charges the boost inductor L during the on-time pulse applied to the gate of the switch M.

The basic circuit of FIG. 1, also shows a common condition of direct AC line feed of the switching PFC power converter through a full bridge rectifier and filter capacitor C1.

The PFC generates a fixed DC output voltage Vout. The average current absorbed from the input mains typically has a rectified sinusoidal shape of a desired amplitude in phase with the rectified input voltage Vin.

Figure 2:
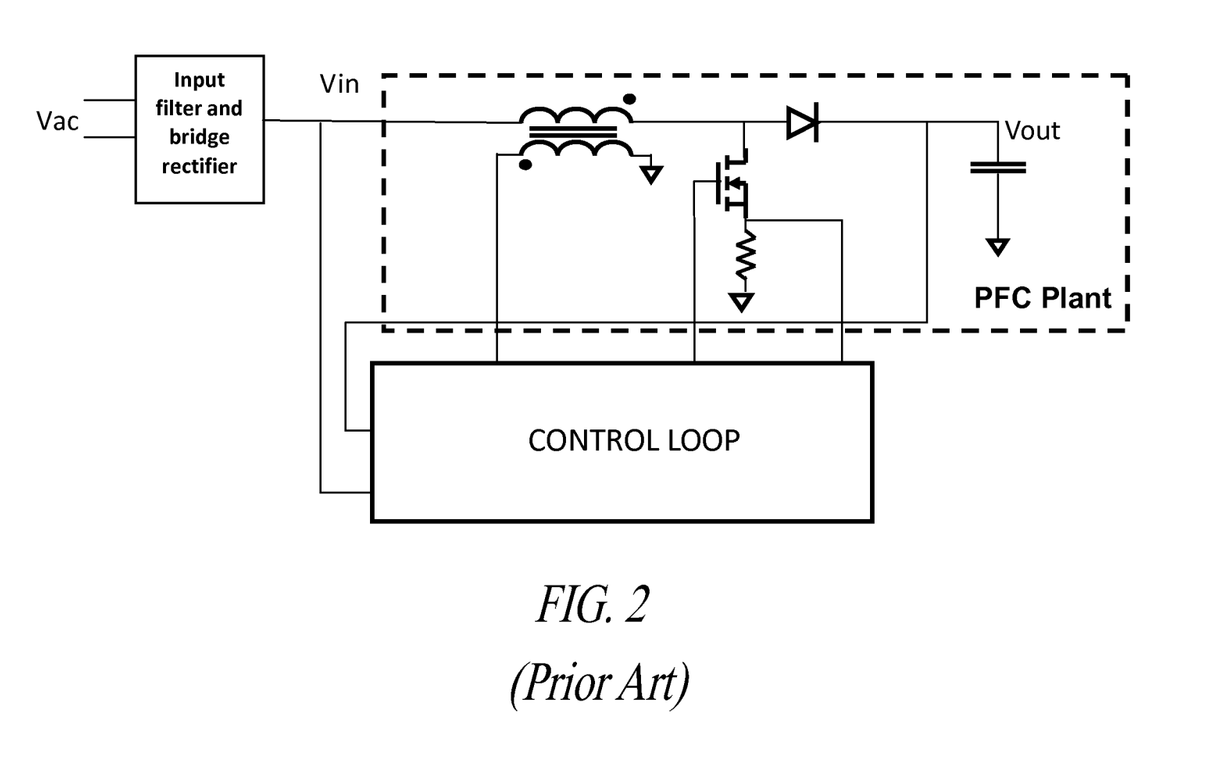
FIG. 2 shows the core circuit (PFC Plant) of a PFC power converter and first circuit means for controlling it.

FIG. 2 shows the basic circuit (PFC Plant) of the PFC power converter of FIG. 1 and first circuit means CONTROL LOOP for controlling it.

Figure 3:
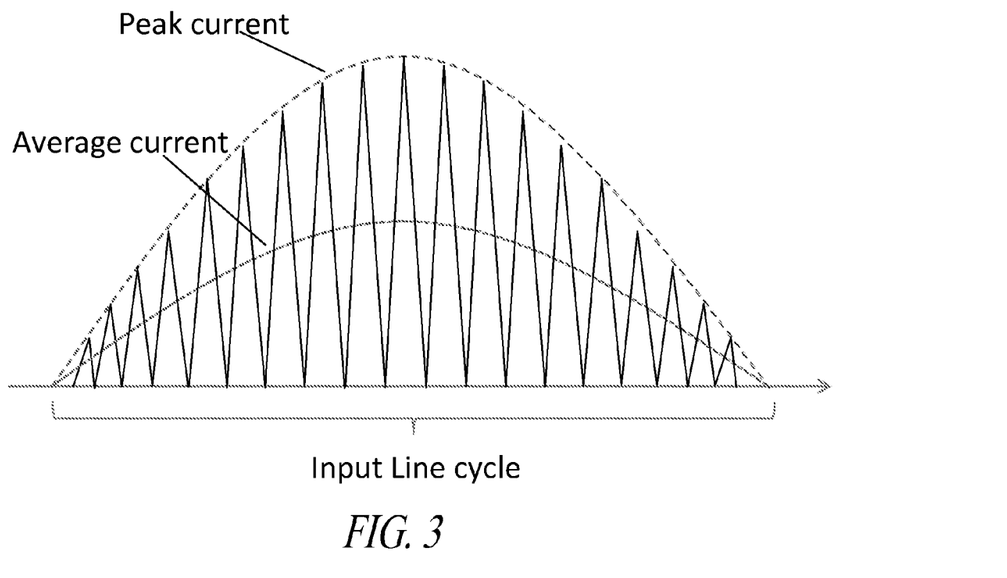
FIG. 3 shows a typical discontinuous current waveform for an input line cycle of a rectified AC sinusoidal feed voltage input to the PFC power converter operating in a transition mode (TM).

FIG. 3 shows a typical discontinuous current waveform for a cycle of a rectified AC sinusoidal feed voltage input to the PFC power converter operating in a transition mode (TM). The output DC power and input current waveform are controlled by regulating the duration of the on-pulse of the gate drive signal that controls the switch. The on-time interval of the switch is commonly set by the controller in function of the output power. Therefore, if the load remains constant the on-time remains constant too. Because the current at the beginning of the cycle is constant, the peak current is Ton*Vin/L, that is, it is proportional to the input voltage (which is in fact the target behavior of a PFC).

The duration of the off-time depends upon the current flowing through the boost inductor L and is sufficient to let this current go to zero. The transition mode peculiarity of zeroing the current $I_L$ in the inductor at every switching cycle, has the drawback of producing a current ripple of amplitude that is about twice the average value of the power transfer current (i.e., the average current).

In order to improve efficiency, PFC are controlled with the following techniques:

Off-time modulation to linearly decrease the switching frequency under light load conditions (for example, as in the device SG6846 of System General). This modulation allows to improve efficiency reducing switching frequency. Anyway in order to guarantee electromagnetic interference (EMI) specifications, tone can put an higher limit to the minimum reachable switching frequency. Efficiency gain is consequently limited;

Skip mode technique that allows to skip cycles near zero crossings of the output voltage where the current is very low. This is obtained using a comparator with a fixed threshold (for example as in the device NCP1611 of ON-semi). This technique with fixed threshold increases current distortion and worsens the power factor;

Burst functioning mode. This technique is largely implemented under very light load condition because it appears more efficient than the above techniques when the load is very small.

It is very hard to meet efficiency requisites that are nowadays imposed by international standards, especially at very light loads. It is still needed a method of controlling a power factor correction converter implemented in a relative control system that allows to maximize efficiency whilst meeting the most recent norms and International standards that impose a limit on harmonic content, PF (power factor) and EMI (electromagnetic interference).

BRIEF SUMMARY

Deep studies carried out by the inventors have led to conclude that state-of-art techniques aiming at improving efficiency at light load conditions are not capable of dramatically reducing switching losses while keeping good total harmonic distortion (THD) and power factor (PF) and ultimately meeting most recent norms and standards. Besides, burst mode techniques seem unsuitable for controlling power factor correction converters in many applications that require a very small output fluctuations (ripple) in all output power conditions. Indeed, burst mode techniques not only increase fluctuations (ripple) of the output voltage, which is not acceptable in many applications, but also increase stresses on electronic components and may cause acoustic noise.

It has been thus devised a method, implementable in a related closed-loop control system, of controlling, even at very light load conditions without entering in a burst functioning mode, a power factor correction converter comprising a boost inductor (L), a switch (M), a diode (D), an output tank capacitor (Cout), the method comprising the steps of:

generating a sense signal representative of a rectified AC input voltage (Vin) or of an inductor current flowing throughout said boost inductor (L) of said power factor correction converter;

turning on the switch (M) when a zero current condition through the boost inductor (L) is determined and turning off the switch (M) after an on-time interval (Ton) has elapsed;

generating a feedback signal (Vcomp) representative of an output power delivered by the power factor correction converter, in function of an output voltage of the power factor correction converter;

comparing the feedback signal (Vcomp) with at least one power threshold (VTHpower);

if the feedback signal (Vcomp) is smaller than the at least one power threshold (VTHpower):

generating a command signal representing a phase domain including 0 and π determined upon the feedback signal (Vcomp) and upon the at least one power threshold (VTHpower); and keeping off the switch when the phase of the input rectified AC voltage (Vin) or of the inductor current is comprised in the phase domain even if the zero current condition has been determined.

The closed-loop control systems of this disclosure may be used to realize a switched power supply, by connecting a switching regulator such to be supplied with the output voltage delivered by a power factor correction converter controlled by the closed-loop control system of this disclosure.

The claims as filed are integral part of this specification and are herein incorporated by reference.

BRIEF DESCRIPTION OF THE SEVERAL VIEWS OF THE DRAWINGS

The invention may be more fully understood by reading the subsequent detailed description and examples with references made to the accompanying drawings, wherein.

DETAILED DESCRIPTION

The following description has the purpose of illustrating the general principles of the disclosure and should not be taken in a limiting sense. The scope of the invention is best determined by reference to the appended claims.

The peculiar aspects of this disclosure are hereafter described for the case of one of common PFC circuit configurations though the characteristic features of the disclosure that will be described may be embodied in any other PFC circuit configuration commonly being used by adapting, in the described exemplified manner, the control circuit of the power factor correction converter (PFC).

Figure 4:
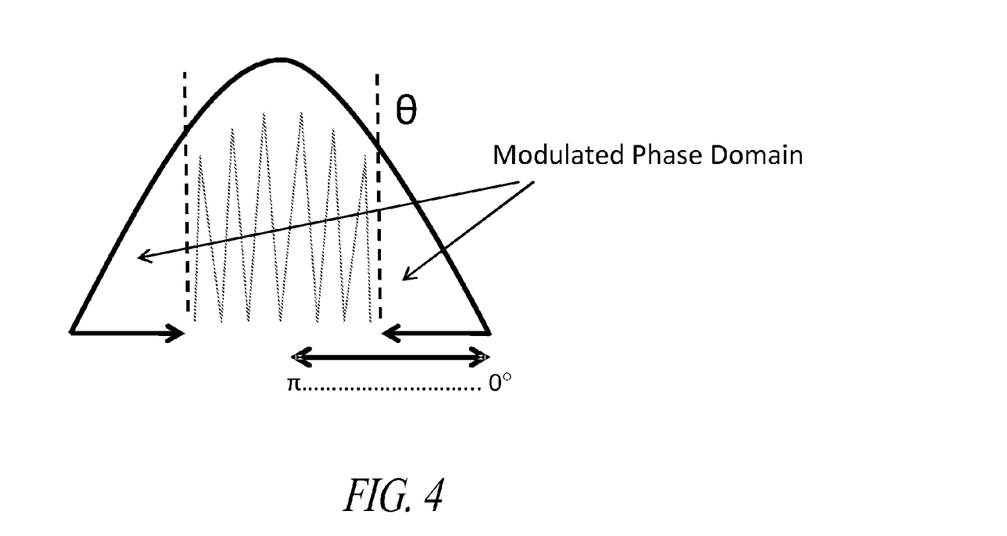
FIG. 4 shows a discontinuous current waveform for an input line cycle of a rectified AC sinusoidal feed voltage input to a PFC power converter operating in a transition mode (TM) and controlled according to an embodiment of the method of this disclosure with a symmetric switching-off phase domain.
Figure 5:
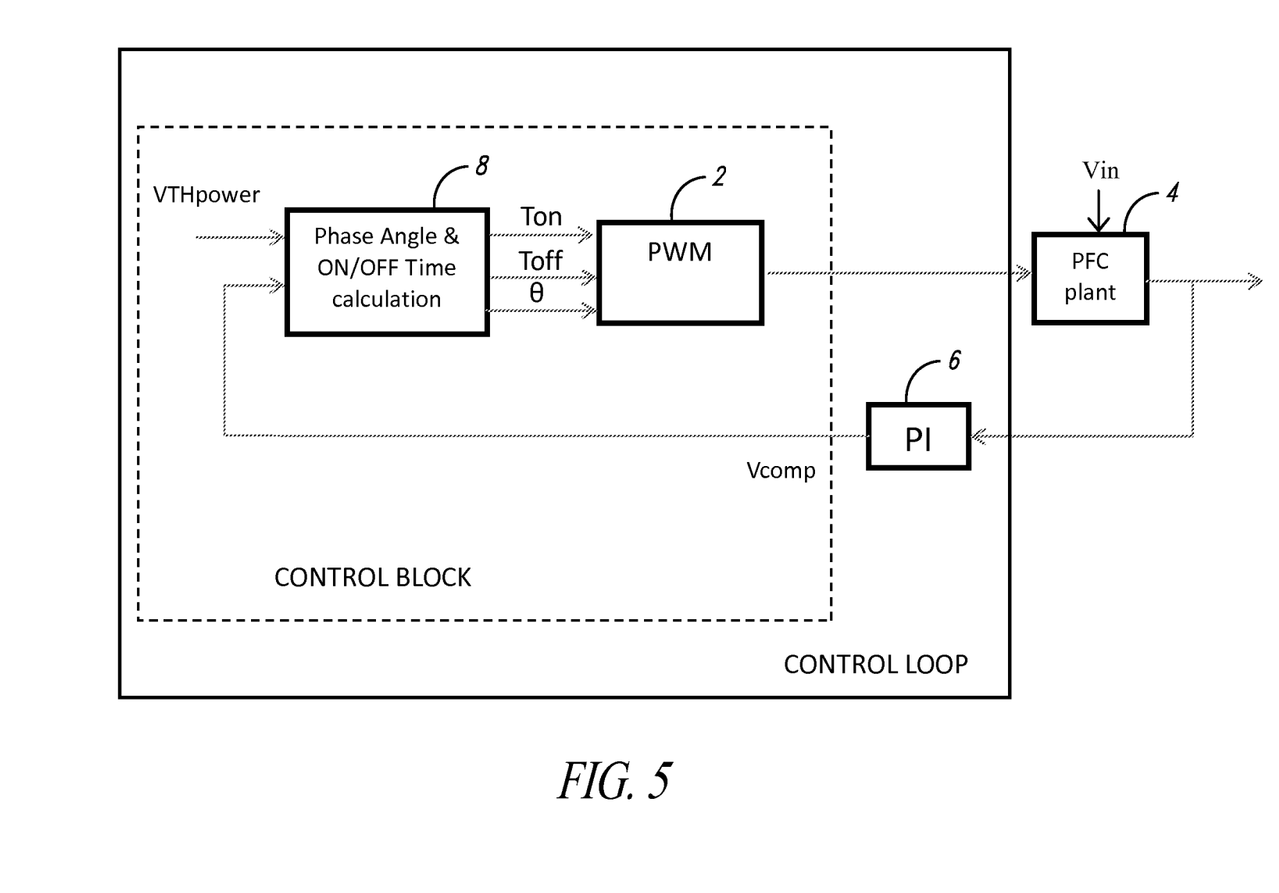
FIG. 5 shows an embodiment of a closed-loop control system CONTROL LOOP of this disclosure, comprising a generic PI controller and a control block CONTROL BLOCK configured in general to determine on-time, off-time and the angle θ of the switch-off phase domain.

According to this disclosure, a control block determines phase intervals of the input voltage during which switching cycles are to be skipped. A schematic time graph that illustrates the herein disclosed technique is shown in FIG. 4. Switching cycles are skipped in a phase domain ("skipping area") including zero-crosses of the rectified input voltage Vin (or, equivalently, of the inductor current flowing throughout the boost inductor L), so that switching cycles are allowed only "far" from these zero-crosses. In practice, the angle θ of the phase domain determines a number of switching cycles to be skipped as a function of the power drawn by the supplied load.

Differently from the skipping mode technique, the technique of this disclosure is activated only if the output power drops below a power threshold, that represents a light load functioning condition. This result is obtained by generating a feedback signal Vcomp, that represents the output power delivered by the power factor correction converter, and by comparing it with at least a threshold VTHpower. In general, the skipping area is not fixed but is determined by the feedback signal Vcomp and is regulated at each input voltage half-cycle of the PFC in order to adjust the delivered power.

According to an embodiment of the method of this disclosure, the phase domain is the union of the phase interval from 0 to θ and of the phase interval from π−θ to π. The value of the phase θ is determined upon the power delivered by the PFC and absorbed by the supplied load. In this case, the phase angle θ, that defines the number of switching cycles to be skipped, may range from a minimum value (practically null) to ninety degrees.

Figure 6:
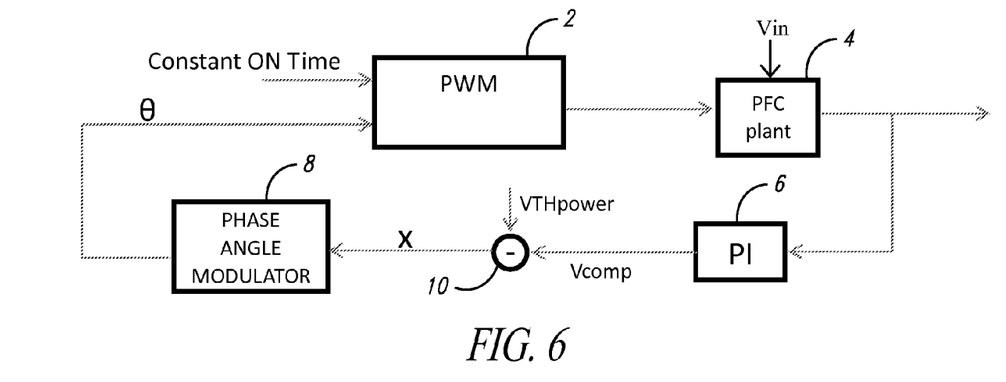
FIG. 6 is a closed-loop control system of a PFC with constant on-time, configured to implement an embodiment of the method of this disclosure with symmetric switching-off phase domain.

FIG. 6 depicts an embodiment of a closed-loop control system of a PFC in which the phase domain is the union of the phase interval from 0 to θ and of the phase interval from π−θ to π. The meaning of each block is summarized in the following table:

| | |
|---|---|
| PWM (2) | Pulse With Modulator that generates the drive signal to GD node according to calculated on-time, off-time and phase angle θ |
| PFC plant (4) | Core circuit of the power factor correction converter |
| PI (6) | Proportional-Integral controller |
| PHASE ANGLE MODULATOR (8) | circuit that fixes at each input line half-cycle the value of the phase θ that determines the phase domain |

The proportional-Integral controller (PI) 6 receives in input the voltage delivered by the PFC 4 and generates a corresponding feedback voltage Vcomp. Since the time integral of the output voltage represents the current flowing through the boost inductor, the feedback voltage Vcomp represents the power delivered by the PFC. A subtractor 10 generates an error voltage X representing the difference between a threshold VTHpower and the feedback voltage Vcomp is generated. The error voltage X is fed into the block phase angle modulator 8 which generates a command signal representing the phase value of θ, corresponding to a number of cycles to be skipped in a switching cycle, for example by applying a generic proportionality law or a nonlinear law. The lower the output power, the lower the feedback voltage Vcomp and thus the greater the error voltage X, the larger the skipping area and thus the greater the number of missed switching cycles.

According to an embodiment, the threshold VTHpower corresponds to about 75 W, in order to comply with THD, PF normative limits.

According to an embodiment, when the error voltage is lower than zero, the switching on time is modulated to regulate the output voltage. In light load condition, when the error voltage X is greater than zero, the switching on-time is kept constant, i.e., independent from the power Pout delivered by the PFC 4. The switching on-time takes the same value as the one calculated by the voltage loop at VTHpower threshold condition and it incorporates feed forward compensation. Keeping switching on time constant means that phase angles $\theta_l$, $\theta_r$ take the place of switching on time as the control loop variable. The calculated switching on time can eventually be adjusted to compensate for the introduction of switching-off phase domain in order to guarantee a smooth transition when operating condition changes.

Moreover, since according to this embodiment VTHpower threshold determines the switching on time value in case of medium/light load condition it could be chosen not only according to PF criteria but also to efficiency purpose. In fact, the higher VTHpower means the higher switching on time in light load condition and then a lower switching frequency resulting in efficiency optimization.

Switching-off phase domain operation can be kept active also in burst mode condition. In this case both phase angles $\theta_l$, $\theta_r$ and the switching on time value assumes a constant and pre-defined value depending on output voltage ripple calculation.

Figure 7:
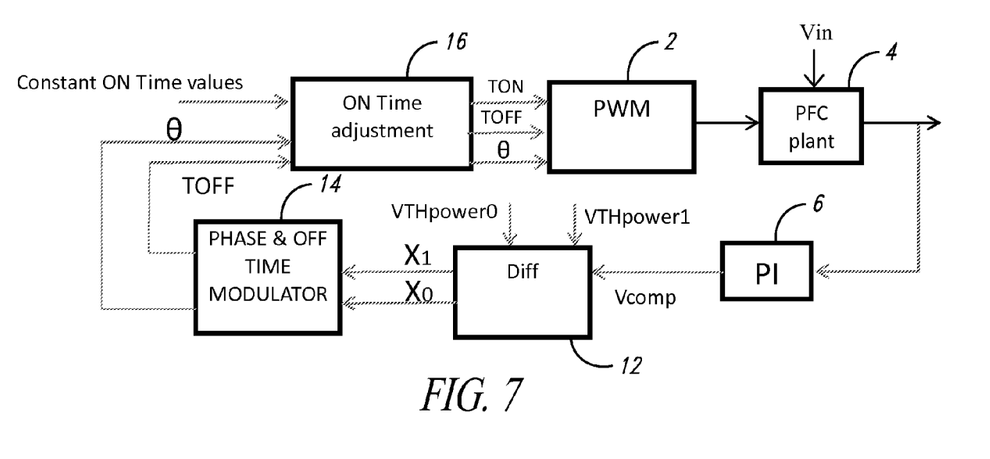
FIG. 7 is a closed-loop control system of a PFC with adjustable on-time and adjustable off-time, configured to implement an embodiment of the method of this disclosure with a symmetric switching-off phase domain.

FIG. 7 shows another embodiment of a closed-loop control system adapted to control a PFC for implementing a method of this disclosure. A differential block (DIFF) 12 compares the feedback signal Vcomp with a first threshold VTHpower0, representing a minimum output power below which the switch M is kept off (i.e., switching is inhibited) in the phase domain, and a second threshold VTHpower1, representing a minimum output power below which the system enters Discontinuous Conduction Mode according to well-known "valley skipping" techniques and generates corresponding difference signals first X0 and second X1. A phase & off time modulator 14 generates a first command signal representing the phase value θ, for example by applying a generic proportionality law or a nonlinear law, and a second command signal TOFF representing an off-time of the switch M. The off-time is calculated as a function of the difference X1 between the threshold VTHpower1 and the feedback signal Vcomp representing the estimated output power, for example according to a proportionality law or, as an alternative, according to a nonlinear law.

An on time selection circuit 16 receives in input the first command signal representing the phase value θ, the second command signal TOFF and a signal CONSTANT ON TIME representing constant on-time values, and selects the duration of the on-time according to system conditions.

According to this embodiment, switching on-time takes the same value as the one calculated by the voltage loop at VTHpower threshold condition. When the system enters DCM condition (threshold VTHpower1), the switching on time value is adjusted to compensate for the introduction of off time modulation.

This control methodology allows regulating even at no load condition without entering burst mode and minimizing output voltage ripple.

Figure 8:
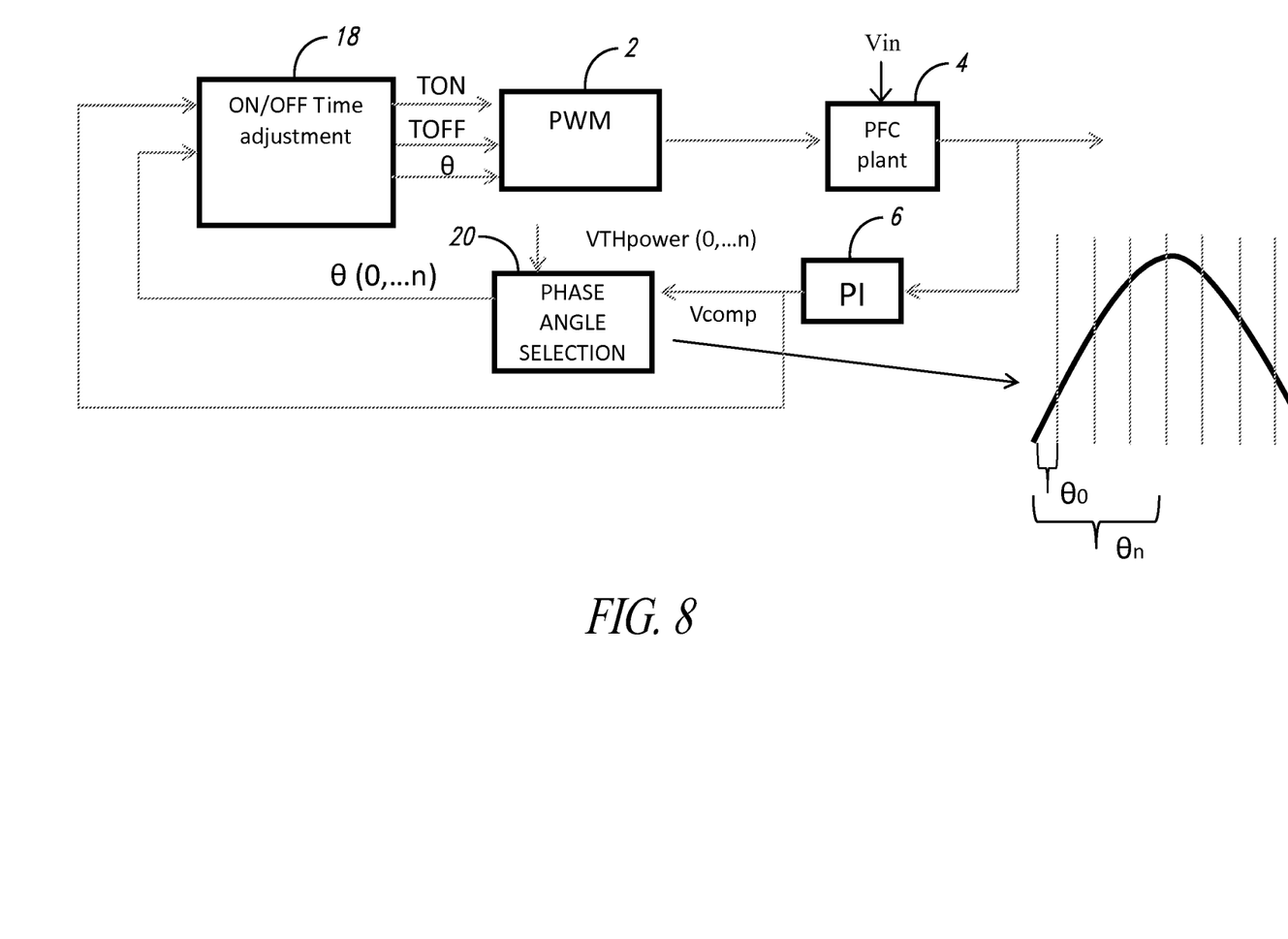
FIG. 8 is an closed-loop control system of a PFC with adjustable on-time and adjustable off-time, configured to implement an embodiment of the method of this disclosure with a symmetric switching-off phase domain.

FIG. 8 depicts yet another embodiment of a closed-loop control system of a PFC that implements yet another embodiment of a method according to this disclosure. The meaning of each block is summarized in the following table:

| | |
|---|---|
| PWM (2) | Pulse With Modulator that generates the drive signal to GD node according to calculated on-time, off-time and phase angle θ |
| PFC plant (4) | Core circuit of the power factor correction converter |
| PI (6) | Proportional-Integral controller |
| ON/OFF TIME ADJUSTMENT (18) | circuit that determines the duration of the off-time and adjusts the duration of the on-time according to phase angle range |
| PHASE ANGLE SELECTION (20) | circuit that selects at each input line half-cycle the value of the phase $\theta_m$ that determines the phase domain |

The value of the feedback voltage Vcomp, representative of the output power, is measured and compared with pre-defined thresholds VTHpower(0, . . . , n), that represent ranges of output power. Each threshold corresponds to a phase value θ defining a respective skipping area. The value of the feedback voltage Vcomp is compared with the thresholds VTHpower(0, . . . , n) and, upon the results of this comparison, a corresponding value of phase $\theta_m$, comprised between $\theta_0$ and $\theta_n$, defining an area during which switching is inhibited, is determined.

Once the phase $\theta_m$ has been selected, basing on $\theta_m$ and Vcomp, the on/off time adjustment circuit 18 determines and properly adjusts the on-time and off-time in order to compensate for the introduction of the switching-off phase domain (θ) so as to keep the output power regulated.

According to an embodiment, the feedback voltage Vcomp is compared with hysteresis with the threshold VTHpower (FIG. 6), with the thresholds VTHpower0 and VTHpower1 (FIG. 7) and with the thresholds VTHpower(0, . . . , n) (FIG. 8).

Figure 9:
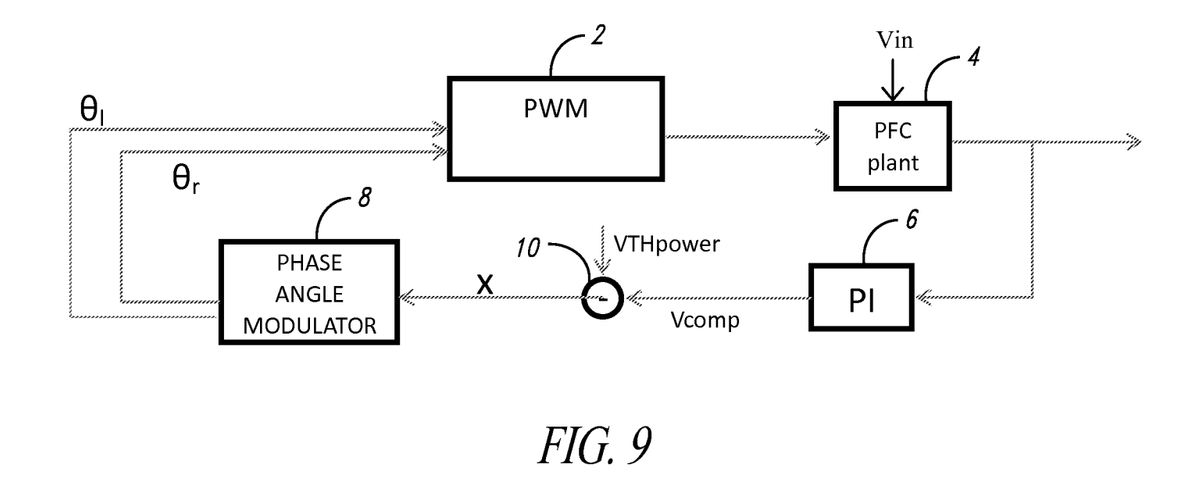
FIG. 9 is a closed-loop control system of a PFC, configured to implement an embodiment of the method of this disclosure with asymmetric switching-off phase domain.

The embodiments of FIGS. 6 to 8 refer to the case in which the phase domain is the union of the phase interval from 0 to θ and of the phase interval from π−θ to π, i.e., is union of two equally large intervals (0, θ) and (π−θ, π). According to an embodiment, the phase domain may be asymmetrical, that is the union of a first interval from 0 to $\theta_l$ and a second interval from π−$\theta_r$ to π, the values of the phases $\theta_l$ and $\theta_r$ being in general different from each other. FIG. 9 depicts schematically a closed-loop control system similar to that of FIG. 6, in which the asymmetrical phase domain, constituted by the union of (0, $\theta_l$) and (π−$\theta_r$, π), is determined by two command signals representing the phases $\theta_l$ and $\theta_r$, respectively.

Clearly, the embodiments shown in FIGS. 6 to 8 may be easily adapted to determine an asymmetrical phase domain in which the switch M of the PFC is kept off, by adapting the phase angle modulator 8 and phase angle selector 20 to generate two command signals representing the phases $\theta_l$ and $\theta_r$.

The closed-loop control systems disclosed herein have the following advantages:
- very high efficiency at medium/light load conditions without negatively affecting current distortion;
- operating frequencies outside EMI filter are avoided;
- ability to regulate the output voltage of the power factor correction converter even at zero load without entering in a burst mode functioning;
- the phase domain (i.e., the phase value θ or the values $\theta_l$ and $\theta_r$) may be properly managed to improve the power factor also at light load conditions.

The shown control systems may be used for realizing switched power supplies, usable for example in TV power supplies or in adapters or in lighting devices, comprising a power factor correction converter, a closed-loop control system of this disclosure configured to control the power factor correction converter, and a switching converter connected so as to be supplied in operation by the power factor correction converter.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a power factor correction converter that includes a boost inductor, a switch, a diode, and an output tank capacitor, the method comprising:
generating a sense signal representative of a rectified AC input voltage or of an inductor current flowing through said boost inductor of said power factor correction converter,
turning on the switch in response to determining, based on the sense signal, a zero current condition through the boost inductor and turning off the switch after an on-time interval has elapsed;
generating a feedback signal representative of an output power delivered by the power factor correction converter, based on an output voltage of the power factor correction converter;
comparing said feedback signal with a power threshold;
if said feedback signal is smaller than said power threshold:
generating a command signal based on said feedback signal and on said power threshold, said command signal representing a phase domain that is a union of a first phase interval between 0 and a phase angle θ and of a second phase interval between π-θ and π, said phase angle θ corresponding proportionally to a difference between said feedback signal and said power threshold;
keeping off said switch when a phase of the input rectified AC voltage or of said inductor current is in said phase domain even if said zero current condition has been determined;
adjusting a duration of an off-time interval of said switch proportionally to a difference between said feedback signal and a second threshold; and
adjusting a duration of the on-time interval of said switch in order to regulate power delivered by the power factor correction converter.

2. The method of claim 1, further comprising:
comparing said feedback signal with a number of fixed thresholds corresponding to different PFC output power ranges,
generating said command signal representative of the phase value θ, which is chosen in a set of an equal number of phase values depending upon results of comparisons of the feedback signal with said fixed thresholds.

3. A method of controlling a power factor correction converter that includes a boost inductor, a switch, a diode, and an output tank capacitor, the comprising:
generating a sense signal representative of a rectified AC input voltage or of an inductor current flowing through said boost inductor of said power factor correction converter,
turning on the switch in response to determining, based on the sense signal, a zero current condition through the boost inductor and turning off the switch after an on-time interval has elapsed;
generating a feedback signal representative of an output power delivered by the power factor correction converter, based on an output voltage of the power factor correction converter;
comparing said feedback signal with a power threshold;
if said feedback signal is smaller than said power threshold:
generating a first command signal representing a first phase angle $\theta_l$ and a second command signal representing a second phase angle $\theta_r$, said phase domain being a union of a first phase interval between 0 and $\theta_l$ and of a second phase interval between $\pi-\theta_r$ and $\pi$, and adjusting said on-time interval and/or an off-time interval of said switch according to said command signals in order to regulate said output power delivered by the power factor correction converter; and
keeping off said switch when a phase of the input rectified AC voltage or of said inductor current is in said phase domain even if said zero current condition has been determined.

4. The method of claim 3, wherein said phase domain is an asymmetrical phase domain.

5. A closed-loop control system of a power factor correction (PFC) converter that includes a boost inductor, a switch, a diode, and an output tank capacitor, said closed-loop control system comprising:
a switch controller configured to receive a command signal and a sense signal representative of a rectified AC input voltage or of an inductor current flowing throughout said boost inductor of said power factor correction converter, to turn on the switch when a zero current condition through the boost inductor is determined, and to turn off the switch after an on-time interval has elapsed;
a feedback circuit configured to receive an output voltage of the power factor correction converter and to generate a feedback signal representing a power delivered by the power factor correction converter; and
a control block configured to receive in input said feedback signal, said control block being configured to compare said feedback signal with a power threshold and, if said feedback signal is smaller than said power threshold, to generate said command signal, based on said feedback signal and said power threshold, said command signal representing a phase angle θ proportionally to a difference between said feedback signal and a first threshold, to command said switch controller to adjust a duration of an off-time interval of said switch proportionally to a difference between said feedback signal and a second threshold, and to adjust a duration of the on-time interval of said switch in order to regulate power delivered by the power factor correction converter, the switch controller being configured to keep off said switch when a phase of the rectified AC voltage or of said inductor current is in said phase domain even if said zero current condition has been determined.

6. The closed-loop control system of claim 5, wherein said on-time interval is constant and said control block is configured to generate said command signal to represent a phase angle θ corresponding to a difference between said feedback signal and said power threshold.

7. The closed-loop control system of claim 5, wherein said control block is configured to compare said feedback signal with a plurality of fixed thresholds corresponding to different output power ranges of the PFC converter and to generate said command signal representative of a phase value, chosen from a plurality of phase values equal in number to the plurality of fixed thresholds, depending upon results of the comparisons of the feedback signal with said fixed thresholds.

8. A closed-loop control system of a power factor correction (PFC) converter that includes a boost inductor, a switch, a diode, and an output tank capacitor, said closed-loop control system comprising:

a switch controller configured to receive a command signal and a sense signal representative of a rectified AC input voltage or of an inductor current flowing throughout said boost inductor of said power factor correction converter, to turn on the switch when a zero current condition through the boost inductor is determined, and to turn off the switch after an on-time interval has elapsed;

a feedback circuit configured to receive an output voltage of the power factor correction converter and to generate a feedback signal representing a power delivered by the power factor correction converter; and a control block configured to receive in input said feedback signal, said control block being configured to compare said feedback signal with a power threshold and, if said feedback signal is smaller than said power threshold, to generate said command signal, based on said feedback signal and said power threshold, the switch controller being configured to keep off said switch when a phase of the rectified AC voltage or of said inductor current is in said phase domain even if said zero current condition has been determined, wherein said switch controller is configured to receive a first command signal representing a first phase angle $\theta_l$ and a second command signal representing a second phase angle $\theta_r$, said phase domain being a union of a first phase interval between 0 and $\theta_l$ and of a second phase interval between $\pi-\theta_r$ and $\pi$; and said control block is configured to command said switch controller to adjust said on-time interval and/or an off-time interval of said switch.

9. The closed-loop control system of claim 8, wherein said phase domain is an asymmetrical phase domain.

10. A switched power supply, comprising:
a power factor correction converter that includes a boost inductor, a switch, a diode, an output tank capacitor; and
a closed-loop control system coupled with said power factor correction converter and including:

a switch controller configured to receive a command signal and a sense signal representative of a rectified AC input voltage or of an inductor current flowing throughout said boost inductor of said power factor correction converter, to turn on the switch when a zero current condition through the boost inductor is determined, and to turn off the switch after an on-time interval has elapsed;

a feedback circuit configured to receive an output voltage of the power factor correction converter and to generate a feedback signal representing a power delivered by the power factor correction converter; and a control block configured to receive in input said feedback signal, said control block being configured to compare said feedback signal with a power threshold and, if said feedback signal is smaller than said power threshold, to generate said command signal, based on said feedback signal and said power threshold, representing a phase angle $\theta$ proportionally to a difference between said feedback signal and a first threshold, to command said switch controller to adjust a duration of an off-time interval of said switch proportionally to a difference between said feedback signal and a second threshold, and to adjust a duration of the on-time interval of said switch in order to regulate power delivered by the power factor correction converter, the switch controller being configured to keep off said switch when a phase of the rectified AC voltage or of said inductor current is in said phase domain even if said zero current condition has been determined.

11. The switched power supply of claim 10, further comprising a switching regulator configured to be supplied with an output voltage delivered by said power factor correction converter.

12. The switched power supply of claim 10, wherein said on-time interval is constant and said control block is configured to generate said command signal to represent a phase angle $\theta$ corresponding to a difference between said feedback signal and said power threshold.

13. The switched power supply of claim 10, wherein said control block is configured to compare said feedback signal with a plurality of fixed thresholds corresponding to different output power ranges of the PFC converter and to generate said command signal representative of a phase value, chosen from a plurality of phase values equal in number to the plurality of fixed thresholds, depending upon results of the comparisons of the feedback signal with said fixed thresholds.

14. A switched power supply, comprising:
a power factor correction converter that includes a boost inductor, a switch, a diode, an output tank capacitor; and
a closed-loop control system coupled with said power factor correction converter and including:

a switch controller configured to receive a command signal and a sense signal representative of a rectified AC input voltage or of an inductor current flowing throughout said boost inductor of said power factor correction converter, to turn on the switch when a zero current condition through the boost inductor is determined, and to turn off the switch after an on-time interval has elapsed;

a feedback circuit configured to receive an output voltage of the power factor correction converter and to generate a feedback signal representing a power delivered by the power factor correction converter; and a control block configured to receive in input said feedback signal, said control block being configured to compare said feedback signal with a power threshold and, if said feedback signal is smaller than said power threshold, to generate said command signal, based on said feedback signal and said power threshold, the switch controller being configured to keep off said switch when a phase of the rectified AC voltage or of said inductor current is in said phase domain even if said zero current condition has been determined, wherein said switch controller is configured to receive a first command signal representing a first phase angle $\theta_l$ and a second command signal representing a second phase angle $\theta_r$, said phase domain being a union of a first phase interval between 0 and $\theta_l$ and of a second phase interval between $\pi-\theta_r$ and $\pi$; and said control block is configured to command said switch controller to adjust said on-time interval and/or an off-time interval of said switch.

15. The switched power supply of claim 14, further comprising a switching regulator configured to be supplied with an output voltage delivered by said power factor correction converter.

* * * * *